J. S. GOLDBERG.
GREASE CUP.
APPLICATION FILED APR. 16, 1914.

1,173,659.

Patented Feb. 29, 1916.

Witnesses:
Leonard W. Novander
Leonard E. Bogue

Inventor
John S. Goldberg
By Brown, Hanson & Boettcher
Att'ys

THE COLUMBIA PLANOGRAPH CO., WASHINGTON, D. C.

UNITED STATES PATENT OFFICE.

JOHN S. GOLDBERG, OF CHICAGO, ILLINOIS, ASSIGNOR TO ALEMITE METALS COMPANY, OF CHICAGO, ILLINOIS, A CORPORATION OF ILLINOIS.

GREASE-CUP.

1,173,659.   Specification of Letters Patent.   Patented Feb. 29, 1916.

Application filed April 16, 1914. Serial No. 832,255.

*To all whom it may concern:*

Be it known that I, JOHN S. GOLDBERG, a citizen of the United States, residing at Chicago, in the county of Cook and State of Illinois, have invented a certain new and useful Improvement in Grease-Cups, of which the following is a full, clear, concise, and exact description, reference being had to the accompanying drawings, forming a part of this specification.

This invention relates to grease cups.

Grease cups of the compression type are especially adapted to provide lubrication of parts of machinery subject to exposure and rough handling and are, in fact, the only practical means of lubricating certain elements of machinery, such as revolving gears, pulleys, automobile springs and bearings, transmission shafts and the like. The jarring and rough treatment incident to the use of such machinery is liable to unscrew the parts of the grease cup and expose the interior of the cup to the entry of grit, dirt and other foreign matter.

One of the objects of my invention is to provide improved means for preventing the unscrewing or loosening of the parts of a grease cup or similar device.

A further object is to improve the construction and to cheapen the cost of manufacture of a grease cup or similar device.

Figure 1:
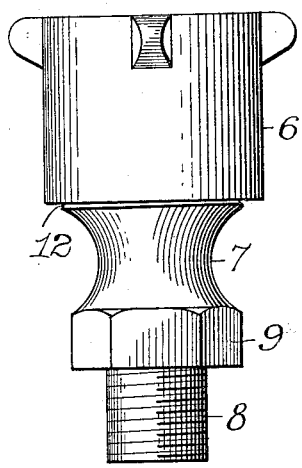
Figure 2:
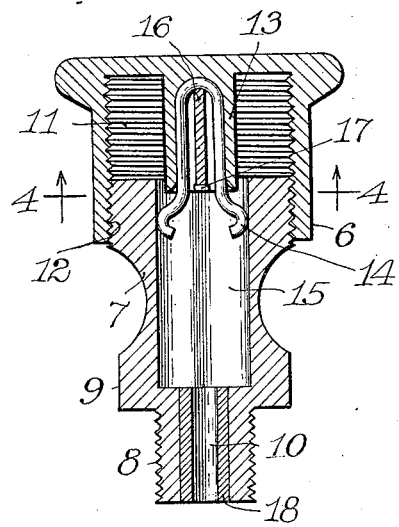
Figure 3:
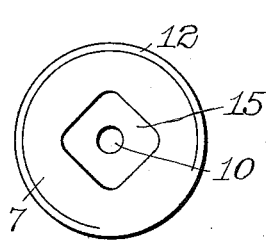
Figure 4:
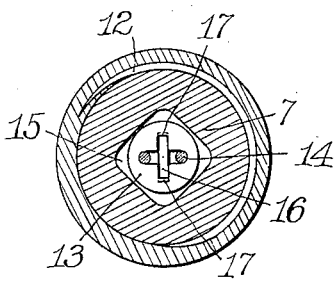
Figure 5:
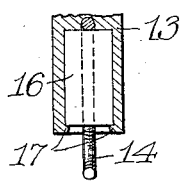

In the accompanying drawings—Figure 1 is an elevation of a grease cup embodying my invention. Fig. 2 is a vertical longitudinal section of the cup shown in Fig. 1. Fig. 3 is a plan view of the stem of the cup. Fig. 4 is a fragmentary detail view showing a cross section of the cup taken on the line 4—4 of Fig. 2. Fig. 5 is a detail view showing the locking spring and the key for holding the spring in place.

The grease cup which has been illustrated as embodying the invention comprises a cap or barrel 6 and a stem 7. The stem is provided with a threaded nipple 8 which is preferably integral with the stem but may be a separate part. The stem is milled to form hexagonal faces 9 to provide ready means for gripping the stem with a wrench. The nipple 8 has a bore 10 running therethrough to connect the recess or bearing in which the nipple 8 may be threaded with the chamber formed in the cap or barrel 6. The cap is internally screw-threaded as shown at 11 to coöperate with the threads 12 on the stem 7. The cap is provided with a projection 13 on the inside thereof which is preferably integral with the cap and a spring 14 is mounted in a recess of this projection. The upper portion of the bore 10 is enlarged into a square shaped counterbore 15 into which the spring 14 projects and with the sides of which this spring forms a yielding lock to prevent relative rotation of the parts. The counterbore 15 is illustrated as of a square outline but the invention is not limited to this particular form of counterbore as any polygon having an even number of sides would be equally suitable, the only consideration governing the form of the counterbore being that diametrically opposite angles or recesses should be provided into which the extremities of the spring 14 are adapted to lodge and thus tend to retain the relative position of the cap 6 and the stem 7.

The spring 14 is formed in a recurved or U-shape having two symmetrical arms which extend out of the recess in the projection 13. The recess is preferably in the form of a slot or flattened opening of such size as to admit the ready insertion of the spring 14 but to prevent any rotation of the spring with respect to the cap 6. Another slot or recess is formed in the stem 13 at right angles to the recess in which the spring 14 is contained. A key 16 may be inserted in this recess and secured therein by battering over the metal of the projection as shown at 17 to retain the key in position. The key in turn secures the spring 14 in position, but allows sufficient play of the spring to secure a limited movement of the ends thereof. The recesses in the projection 13 are secured preferably by forming the cap 6 of a single die-casting. The part 7 may also be formed in the same manner.

The sides of the projection 13 coöperate with the key 16 to limit the movement of the spring 14 and to allow only such amount of play as will insure correct functioning of the spring in its action as a yielding lock. As only limited movement is allowed, there is no likelihood of the spring being accidentally strained or bent out of shape by careless or rough handling.

To prepare the cup for use the nipple is screwed into a suitable opening in the bearing. The cap 6 is unscrewed and filled with grease and is then screwed down upon the stem 7 until the grease is forced between the projection 13 and the sides of the bore 15 and out of the bore 10 of the nipple 8. When the threads 11 and 12 are first started the spring 14 tends to center the cap to facilitate the starting. At every quarter turn of the cap the spring enters the diametrically opposite corners in the bore 15 and causes a yielding locking action to take place as the spring must be compressed by riding against the flat sides of the bore when the cap is moved in either direction of rotation.

By the construction above illustrated and described, a number of advantages are secured. The spring 14 has no sharp bends and due to the mounting in the recess in the stem 13, there is no danger of accidental bending or breaking of this spring. The spring is formed of symmetrical portions and, hence, exerts equal pressure on the sides of the cap 6 and when the cap 6 is threaded to the stem 7, there is no danger of crossing and jamming the screw threads as the spring tends to center the parts. The cap 6 is yieldingly locked in position at every quarter-turn and thus a finer gradation of the setting of the cap 6 can be secured. By making the projection 13 integral with the cap 6, all fine particles of sand and dirt are prevented from coming in contact with the grease.

The stem 7 is preferably constructed of a single die-casting of crystalline metal. Such metal is usually quite brittle and in order to reinforce the nipple 8 and protect it against breakage which might result from rough handling, a wrought-iron or steel sleeve 18 is cast into place inside the nipple 8. The sleeve 18 may be constructed of any other suitable metal, if preferred, and may be provided with projections interlocking with the metal into which it is cast or, if preferred, may be in regular cylindrical, or any other, form. By this construction, I secure a number of important advantages. The joint between the sleeve 18 and nipple 8 is of a very intimate nature and forms a strong and practically unitary structure. The relatively soft metal surrounds the arm and prevents any possibility of damaging the threads in the bearing into which the cup may be screwed, such as might result if the nipple 8 were formed of iron or a hard metal. There is no danger of the threads sticking when threaded into an iron socket as the brass-to-iron joint prevents any tendency to rust and stick.

Although the invention has been illustrated and described with reference to a certain embodiment, it is not intended thereby to limit the invention to such embodiment, nor to any specific mechanism, as the invention is capable of use in a great many different relations and may be subject to numerous modifications apparent to those skilled in the art, all of which fall within the spirit of the invention.

What I claim as new and desire to secure by Letters Patent of the United States is:

1. In a grease-cup, a threaded stem, a threaded cap coöperating with said stem, said stem having a symmetrical non-circular bore, said cap having an axial projection provided with two recesses of rectangular outline and at right angles to each other, a U-shaped spring mounted in one of said recesses, and a key mounted in the other of said recesses for retaining said spring in position.

2. In a grease-cup, a threaded stem, a threaded cap coöperating with said stem, said stem having a symmetrical non-circular bore, said cap having an axial integral projection, said projection being provided with two recesses of rectangular outline and at right angles to each other, a U-shaped spring mounted in one of said recesses and having its free ends engaging the sides of said non-circular bore, and a key fitted into the other of said recesses for holding said spring.

3. In a grease-cup, a threaded stem having a bore of polygonal outline, a cap having screw-threads to engage said screw-threaded stem and provided with an axial integral projection, said projection being slotted, a U-shaped wire spring having free ends adapted to engage said polygonal bore, said spring being mounted in said slot, and a key fitted into said slot for holding said spring.

4. In a grease-cup, a threaded stem, a threaded cap coöperating with said stem, said stem having a bore of rectangular outline, said cap having an axial projection, said projection having two flat axial recesses disposed at right angles to each other, a U-shaped spring in one of said recesses, and a key in the other of said recesses for holding said spring.

5. In a grease cup, a stem of crystalline metal having a threaded nipple and a bore through said nipple, and a sleeve of a metal of high tensile strength positioned in said bore and intimately united therewith.

In witness whereof, I hereunto subscribe my name this 9th day of April, 1914.

JOHN S. GOLDBERG.

Witnesses:
JOHN A. DIENNER,
LEONARD W. NOVANDER.